(12) United States Patent
Rothberg (10) Patent No.: US 8,924,341 B2
(45) Date of Patent: Dec. 30, 2014

(54) METHOD AND SYSTEM FOR OPTIMIZING MIXED INTEGER PROGRAMMING SOLUTIONS

(75) Inventor: Edward E. Rothberg, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1615 days.

(21) Appl. No.: 11/378,575

(22) Filed: Mar. 17, 2006

(65) Prior Publication Data
US 2009/0228417 A1    Sep. 10, 2009

(51) Int. Cl.
G06F 15/00    (2006.01)
G06F 15/18    (2006.01)
G06N 3/12    (2006.01)
G06N 5/00    (2006.01)

(52) U.S. Cl.
CPC ............... *G06N 3/126* (2013.01); *G06N 5/003* (2013.01)
USPC ........................................................ 706/62

(58) Field of Classification Search
USPC ..................................................... 706/13, 62
See application file for complete search history.

(56) References Cited

U.S. PATENT DOCUMENTS

| | | |
|---|---|---|
| 2002/0156663 A1 | 10/2002 | Weber et al. |
| 2004/0139107 A1* | 7/2004 | Bachman et al. .......... 707/104.1 |
| 2004/0172321 A1 | 9/2004 | Vemula et al. |
| 2004/0196946 A1 | 10/2004 | Chao et al. |

OTHER PUBLICATIONS

Yokota, T., Gen, M. And Li, Y. "Genetic Algorithm for Non-Linear Mixed Integer Programming Problems and Its Applications," Computers Ind. Engng vol. 30, No. 4, 1996, pp. 905-917.*
Qu, P., "Multiple Orders per Job Scheduling Problems,", Dissertation, University of Arkansas, 2004.*
Danna et al. "Exploring relaxation induced neighborhoods to improve MIP solutions Math. Program", Ser. A 102: 71—90, Jan. 2005.*

(Continued)

*Primary Examiner* — Li-Wu Chang
(74) *Attorney, Agent, or Firm* — Steven M. Greenberg, Esq.; CRGO Law (57) ABSTRACT

Systems and methods for generating improved solutions to MIP models are described. The present invention involves the use of a polishing algorithm that uses mutation and combination of solutions within a solution pool to generate improved solutions. The polishing algorithm first randomly selects one or more seed solutions from a solution pool for mutation. The selected seed solutions are mutated by fixing a subset of integer variables in the models to the value they take in the seed solution. The remaining variables are then formulated into a sub-MIP problem that is solved by the MIP solver. The solutions generated from this mutation process may then be added to the solution pool. After the one or more iterations of the mutation processes have taken place, the polishing algorithm then selects one or more pluralities of parent solutions from the solution pool to use in generating offspring solutions. The integer variables that agree between one plurality of parent solutions are fixed in the offspring solution. The remaining variables are then formulated into a sub-MIP problem that is solved by the MIP solver. The offspring solutions generated by the combination process may then also be added to the solution pool.

40 Claims, 4 Drawing Sheets

(56) References Cited

OTHER PUBLICATIONS

Yokota et al. "Genetic Algorithm for Non-Linear Mixed Integer Programming Problems and Its Applications," Computers Ind. Eng. vol. 30, No. 4, 1996, pp. 905-917.*

Anbil et al., "Recent Advances in Crew-Pairing Optimization at American Airlines", Interfaces 21:1, pp. 62-74, Jan.-Feb. 1991.

Beck et al., "Combining Local Search and Linear Programming to Solve Earliness/Tardiness Scheduling Problems", In Proceedings of the Fourth International Workshop on Integration of AI and or Techniques in Constraint Programming for Combinatorial Optimisation Problems (CP-AI-OR '02), pp. 221-235, 2002.

Bixby et al., "MIP: Theory and Practice—Closing the Gap", pp. 19-49, Kluwer Academic Publishers, 2000.

Chabrier et al., "Solving a Network Design Problem", Submitted to Annuals of Operations Research, Special Issue Following CP-AI-OR '2002, 2003, pp. 1-31.

Danna et al., "Exploring Relaxation Induced Neighborhoods to Improve Mip Solutions", Mathematical Programming, Ser. A 102:71-90 (2005).

Fischetti et al., "Local Branching", Mathematical Programming, 98:23-47, 2002.

Fischetti et al., "Repairing MIP Infeasibility Through Local Branching", pp. 1-9, IBM Research Report, RC23532 (W0502-107), Feb. 17, 2005.

Fischetti et al., "The Feasibility Pump", Mathematical Programming, Ser. A 104, 91-104, 2005.

French et al., "Using a Hybrid Genetic-Algorithm/Branch and Bound Approach to Solve Feasibility and Optimization Integer Programming Problems", Journal of Heuristics, 7:551-564, 2001.

Glover, "Scatter Search to Generate Diverse MIP Solutions", Kluwer Academic Publishers, 2000, pp. 299-317.

Holland, "Adaptation in Natural and Artificial Systems", the University of Michigan Press, 1975.

Martin et al., MIPLIB 2003, http://miplib.zib.de, 2003 <last visited May 9, 2006>.

Mitchell, "An Introduction to Genetic Algorithms", MIT Press, 1996.

Nieminen et al., "Genetic Algorithm for Finding a Good First Integer Solution for Milp", Technical Report 2003/4, Imperial College, pp. 1-16, 2003.

Puchinger et al., "Combining Metaheuristics and Exact Algorithms in Combinatorial Optimization: A Survey and Classification", Proc. of the First Int'l. Work-Conf. on the Interplay Between Natural and Artificial Computation, 3562 Lecture Notes in Computer Sci. 41-53, 2005 <copy obtained at http://www.ads.tuwien.ac.at/publications/bib/pdf/puchinger-05.pdf>.

Lichtenberger et al., "An Extended Local Branching Framework and its Application to the Multidimensional Knapsack Problem", Master's Thesis, Vienna University of Technology, Institute of Computer Graphics and Algorithms, Mar. 2005.

Rothberg, Edward, "An Evolutionary Algorithm for Polishing Mixed Integer Programming Solutions", (initially submitted Aug. 2005, forthcoming publication in INFORMS Journal on Computing).

Rothberg, Edward, "It's a beautiful day in the neighborhood—Local search in mixed integer programming", http://www.ima.umn.edu/matter/W7.25-29.05/, Jul. 25-29, 2005 <last visited May 17, 2006>, pp. 1-46.

Rothberg, Edward, "It's a Beautiful Day in the Neighborhood—Local Search in Mixed Integer Programming", Address at IMA Special Workshop: Mixed-Integer Programming (Jul. 28, 2005) <slide presentation printed May 17, 2006>.

Surie, MLCLSP test instances, http://www.bwl.tu-darmstadt.de/bwl1/forschung/ti_mlclsp/ti_mlclsp.php?FG=bwl1, 2002 <last visited May 5, 2005>.

Van Vyve et al., "A General Heuristic for Production Planning Problems", Core Discussion Paper, 56, 2001, pp. 1-25.

Smith, J. and T. C. Fogarty, "Adaptively Parameterised Evolutionary Systems: Self Adaptive Recombination and Mutation in a Genetic Algorithm," International Conference on Evolutionary Computation, pp. 441-450 (1996).

Smith, J. and T. C. Fogarty, "Self Adaptation of Mutation Rates in a Steady State Genetic Algorithm," International Conference on Evolutionary Computation, pp. 318-323 (1996). <retrieved from http://www.cems.uwe.ac.uk/~jsmith/ on May 22, 2007>.

\* cited by examiner

METHOD AND SYSTEM FOR OPTIMIZING MIXED INTEGER PROGRAMMING SOLUTIONS

CROSS-REFERENCES TO RELATED APPLICATIONS

None

STATEMENT REGARDING FEDERALLY SPONSORED RESEARCH OR DEVELOPMENT

None

INCORPORATION-BY-REFERENCE OF MATERIAL SUBMITTED ON A COMPACT DISC

None

BACKGROUND OF THE INVENTION

1. Field of the Invention

The present invention relates generally to systems and methods for generating solutions to global optimization problems. More particularly, the present invention relates to systems and methods for finding improved solutions to mixed integer problems through the use of evolutionary algorithms.

2. Brief Summary of the Invention

Mixed Integer Programming is a versatile, widely used technique for solving a variety of practical optimization problems. Generally, a mixed integer program ("MIP") is an optimization problem of the form:

minimize $f(x)$
subject to $G(x)=b$
$l \leq x \leq u$
some or all $x_j$ integral, where x is a vector of variables, l and u are vectors of bounds, $f(x)$ is an objective expression, and $G(x)=b$ is a set of constraint expressions. While the above model has a minimization objective, one of skill will recognize that models may have maximization objectives.

The simplest and most widely used form of MIP model is the Mixed Integer Linear Program (MILP):

minimize $c^T x$
subject to $Ax=b$
$l \leq x \leq u$
some or all $x_j$ integral, where A is an m by n matrix, called the constraint matrix, and c is the linear objective vector. Thus, as one of ordinary skill in the art would recognize, a MILP is a linear program ("LP") with an integrality restriction on some or all of the variables. Other forms of MIP model include the Mixed Integer Quadratic Program (MIQP), Mixed Integer Quadratically Constrained Program (MIQCP), and Mixed Integer Non Linear Program (MINLP).

While the integrality restriction makes MIPs difficult to solve (both in general terms, and NP-hard in the technical sense), this restriction also makes the mixed-integer modeling paradigm a powerful tool in representing real-world business applications. In many situations, the solution to a MIP can yield a cost or benefit (for example, in dollars or other units) of pursuing a certain course of business. In a situation wherein the MIP solution yields a cost in dollars, the optimal solution might be one wherein the dollar cost is minimized. In a situation wherein the MIP solution yields the number of linear-feet of lumber that can be harvested from a forest, the optimal solution might be a solution wherein the number of linear-feet is maximized.

While absolute optimal solutions can and have been found for some MIPs (e.g., some MIPs with a small number of variables (n) or constraints (m)), for many MIPs, only solutions that are not provably optimal have been found. These solutions are often referred to as "best known" or "best objective" solutions. Such best known solutions still provide significant practical value in many situations. In these cases, it is often desirable to find the best known solution using the least amount of resources.

(As used herein, "resources" can refer to money, time (seconds, minutes, hours, days, weeks, etc.), computer processor cycles, man-hours, or any other resource of which further depletion might theoretically yield a better solution. As also used herein, "optimize" means to improve the result, regardless of whether such improvement results in the absolute optimal result.)

For still other MIPs, no solution has yet been found. In such cases, it is necessary to find an initial feasible solution to the MIP model before the teachings set forth herein may be used to improve upon the initial solution while using a limited amount of resources.

More particularly, while with unlimited resources it might be possible to find one or more provably optimal or best objective solutions to any MIP, within the bounds of practicality, available resources are often limited. For example, the MIP solution might yield the distance and roads taken for the shortest road route between Lakeside, Ariz. and New York, N.Y. If this solution is being generated by a business interest, for a person using an internet mapping service, the limiting resource might be a time limitation of ten seconds. If forced to wait longer than ten seconds for a solution, the person might become frustrated and request a solution from a competitor. In this example, it would be desirable to find a best known solution with a resource limitation of ten seconds. However, without the resource limitation, it might be possible to find a provably optimal solution by considering every road leaving Lakeside, Ariz., every connecting road, and so on. Yet, the provably optimal solution might be less valuable if not delivered within the appropriate resource limitation.

In another example, the MIP solution might yield the cost in dollars of deploying each of 10,000 employees, having diverse skill sets, to perform certain tasks for a company. It might be desirable to determine the least costly manner to deploy the employees. Without any resource limitation, it might be possible to find a provably optimal solution by considering every possible deployment of every employee. Yet, the provably optimal solution might be less valuable if not delivered within an appropriate resource limitation. That is, the cost of exceeding the resource limitation might exceed the cost savings realized by finding a provably optimal solution.

Other examples of optimality problems addressed by MIPs include optimization of supply chain configurations (see U.S. Patent Application Publication Serial No. US 2002/0156663 A1, dated Oct. 24, 2002), loading patterns for a nuclear reactor core (see U.S. Patent Application Publication Serial No. US 2004/0196946 A1, dated Oct. 7, 2004), supply channel and contract modeling (see U.S. Patent Application Publication Serial No. US 2004/0172321 A1, dated Sep. 2, 2004), airline scheduling and ticket sales, and many other complex problems.

The standard technique for solving MIP problems is a version of divide-and-conquer known as relaxation-based branch-and-cut. The branch-and-cut algorithm begins by solving the continuous relaxation, obtained by simply deleting the integrality restrictions. If the relaxation is found to be infeasible, then the original problem is also infeasible and the algorithm is complete. If the relaxation has a solution, and the solution satisfies all the integrality restrictions of the problem, the solution is optimal and the algorithm is complete. Otherwise, some integrality restriction is violated. In this case, an integral variable $x_j$ having a currently fractional value $x_j^*$, is picked. The problem is "branched," creating two disjoint "child" problems from the initial single "parent" problem by restricting the range of the integral variable. Specifically, a variable with a lower bound l and an upper bound u will be divided into two problems with ranges l to q and q+1 to u, respectively. These two child nodes are subsequently processed, possibly creating further child nodes.

In the course of exploring nodes, the branch-and-cut algorithm maintains bounds on the best and worst possible objective value that may be attained by the optimal solution. Feasible solutions provide bounds on the worst objective value. Bounds on the best objective value are obtained from the continuous relaxations of the problem.

At each node, the branch-and-cut algorithm can optionally search for constraints which are violated by the continuous relaxation, but not violated by any optimal integer solutions. Such constraints are referred to as cutting planes. When these constraints are added, the old non-final solution is no longer valid, and the new solution generated will be different, potentially resulting in a better lower bound for that child problem.

The branch-and-cut algorithm continues processing nodes created in this manner until the set of unprocessed nodes is exhausted, or until a user-imposed resource limit is exceeded.

More recently, methods for finding high quality, feasible solutions to MIP models that involve exploring the neighborhood of a given feasible solution (referred to as "limited neighborhood exploration strategies"), have also been investigated. One such approach is called Relaxation Induced Neighborhood Search ("RINS"). This method constructs a promising neighborhood using information contained in the continuous relaxation of the MIP model. Neighborhood exploration is then formulated as a MIP model itself and solved recursively. Another approach, called guided dives ("GD"), is a simple modification of the MIP tree traversal order. This technique "guides" the search towards nodes that are close neighbors of the best known feasible solution. Further discussion of RINS and GD can be found in Emilie Danna et al., Exploring relaxation induced neighborhoods to improve mip solutions, Mathematical Programming, 98:23-47, 2002. A third such limited neighborhood exploration strategy is local branching ("LB"). LB is a local search meta-heuristic for MIPs that is entirely embedded in a branch-and-cut framework, and which partitions the search tree through local branching cuts. See Matteo Fischetti and Andrea Lodi, Local Branching, Mathematical Programming, 98:23-47, 2002.

However, these local neighborhood exploration strategies suffer from several drawbacks. First, such strategies, because they focus on the neighborhoods of a given feasible solution, often yield solution pools that are lacking in diversity. Second, these local exploration strategies can still leave significant optimality gaps for many important MIP models.

One application that employs non-evolutionary algorithms is the Sabre TRIP crew pairing system. This system is described in an article titled, "Recent Advances in Crew-Pairing Optimization at American Airlines," by Ranga Anbil et al. In this system, the solution to a set partitioning problem is successively improved by iteratively forcing a random collection of sets into the solution, then solving a smaller set partitioning problem on the remaining sets. However, the method employed by TRIP for choosing the subset of variables to fix is domain dependent, i.e. it is based upon structural information about the crew repair problem that the method is designed to solve, and therefore is not applicable to general MIP models. (Indeed, many evolutionary algorithms require structural information about the problem to be solved above and beyond the information contained in the original MIP formulation). Further, this method only searches for an improved solution based upon a single given known solution. It does not maintain a pool of solutions. Therefore, it ignores sub-optimal solutions that may be useful for improving diversity in a solution pool, and it cannot be integrated within an existing solution generating framework.

In addition to these limited neighborhood exploration strategies, recent attempts at generating solutions to MIPs have also focused on the development of "evolutionary algorithms." Evolutionary algorithms are based on a natural selection analogy, in which a population of solutions evolves from one generation to the next through combination and mutation. Specifically, evolutionary algorithms typically begin with an initial population of solutions (referred to as a solution pool). While a solution pool may be partially or completely empty, it typically has room for a plurality of solutions. Each of the members of the solution pool is evaluated based on some objective criteria. This evaluation yields an objective value for each member. A subpopulation of the solution pool comprising two or more parents is then selected for offspring production. The parents are combined to generate offspring. The offspring are mutated by introducing random changes into some subset of the offspring. "Survivors" are then selected based upon an evaluation of the mutated offspring using objective criteria, which survivors then constitute a new population.

One category of evolutionary algorithm that has received recent attention is the "genetic algorithm." Genetic algorithms adhere even more closely to the natural selection analogy than the description of evolutionary algorithms set forth above. As with other types of evolutionary algorithms, genetic algorithms typically maintain a population of solutions. Initially, the solution pool typically comprises one or more random initial guess solutions. However, the representation of these solutions is limited, such that the solutions (i.e., "genomes") contained within the solution pool are defined using sequences of bits (i.e., "genes"). In each phase of the algorithm, a new generation of solutions is formed from the previous generation. First, one or more solutions in the solution pool are mutated, by complementing one or more bits in the bit sequence of that solution. Next, a pair of candidate solutions are selected to combine (referred to as "crossover") to produce offspring. These solutions are then combined by concatenating subsequences from the parents' genomes. The solutions are then evaluated using objective criteria to determine the survivors, which survivors constitute a new population.

However, genetic algorithms also suffer from several drawbacks. First, in the context of MIP problems, with the use of genetic algorithms, it is quite difficult to pass desirable solution properties from parents to offspring using the representation described above. Further, in the same context, genetic algorithms are generally unable to retain linear feasibility in the offspring.

One example of an application of a genetic algorithm is disclosed in Kimmo Nieminen, Sampo Ruuth, and Istvan Maros, Genetic algorithm for finding a good first integer solution for milp, Technical Report 2003/4, Imperial College, 2003. In the system disclosed therein, an initial population of genomes is randomly generated. These solutions are then mutated by flipping a bit in the solution representation. However, the approach disclosed therein places little, if any emphasis on retaining feasibility in offspring. Moreover, this scheme is focused upon finding an initial feasible solution, and is not readily adaptable to improving known solutions.

Thus, even given the recent developments in methods for generating solutions to MIP models described above, current known solution techniques can leave significant optimality gaps for many important models due to non-optimal use of resources (such as time), limited applicability, and other concerns. Therefore, it would be desirable to provide an improved method for generating high quality solutions to difficult MIP models.

It would also be desirable to provide a method by which solutions to a MIP model might be improved given one or more resource limitations.

It would also be desirable to provide a method for implementing a domain independent evolutionary algorithm by which improved solutions to MIP models can be generated.

It would also be desirable to provide a method for implementing an evolutionary algorithm that uses sub-optimal solutions for improving the diversity in the solution pool.

It further would be desirable to provide a method for implementing an evolutionary algorithm wherein desirable solution properties are passed from parents to offspring.

SUMMARY OF THE PRESENT INVENTION

It is an object of the present invention to provide an improved method for generating solutions to difficult MIP models.

It is an object of the present invention to provide a method by which a solution to a MIP model might be improved given one or more resource limitations.

It is an object of the present invention to provide a method for implementing a domain independent evolutionary algorithm by which improved solutions to MIP models can be generated.

It is an object of the present invention to provide a method for implementing an evolutionary algorithm that uses sub-optimal solutions for improving the diversity in the solution pool It is an object of the present invention to provide a method for implementing an evolutionary algorithm wherein desirable solution properties are passed from parents to offspring.

These and other objects of the present invention are accomplished by providing systems and methods for implementing a domain independent evolutionary algorithm for generating improved solutions to MIP models.

The present invention generally encompasses a software program operating on a computer including a general purpose microprocessor that implements an improved evolutionary algorithm for generating improved solutions to MIP models (referred to herein, in whole or in part, as a "polishing" algorithm.)

In a preferred embodiment of the invention, the polishing algorithm is invoked at a given node within a MIP search tree generated by a general MIP solver.

When invoked, the algorithm performs one or more iterations of a mutation process as follows. First, the polishing algorithm randomly selects one or more seed solutions from a solution pool for mutation. Next, the seed solution is mutated by fixing a subset of integer variables in the models to the value they take in the seed solution. The number of variables to fix may be determined by setting and modifying a fixing fraction as described herein. The remaining variables are then formulated into a sub-MIP problem that is solved by the MIP solver. The solutions generated from this mutation process may then be added to the solution pool.

After the one or more iterations of the mutation processes have taken place, the polishing algorithm then performs one or more iterations of a combination process as follows. First, the algorithm selects a plurality of parent solutions from the solution pool to use in generating offspring solutions. The integer variables that agree between two or more of the parents are then fixed in the offspring solution. The remaining variables are then formulated into a sub-MIP problem that is solved by the MIP solver. The offspring solutions generated by the combination process may then also be added to the solution pool.

In another embodiment of the invention, the combination process is invoked by the polishing algorithm prior to the invocation of the mutation process.

In another embodiment of the invention, a solution from a truncated MIP search tree is input by the MIP solver to the polishing algorithm, which then performs the mutation and combination processes described above to generate an improved solution.

DETAILED DESCRIPTION OF THE INVENTION

Figure 1:
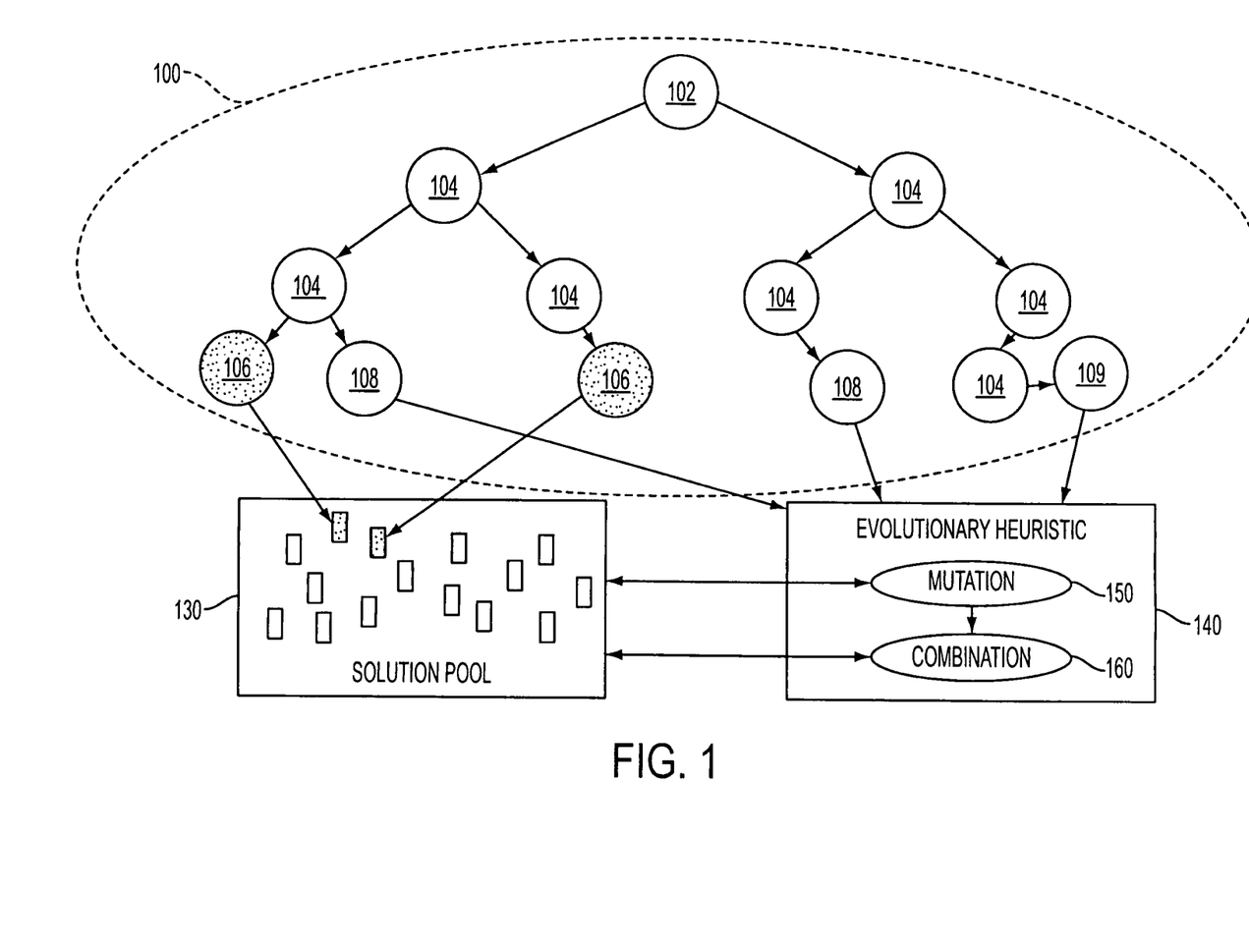
FIG. 1 shows an example of integration of the polishing algorithm of the present invention within a MIP search tree generated by a general MIP solver.

In FIG. 1, the overall architecture of the polishing algorithm of the present invention within a MIP search tree is described. MIP search tree 100 represents a search tree generated by a standard MIP solver 101 (not shown) in connection with generating at least one solution to a MIP model. MIP solver 101 is a software program that at least can employ branch and bound or branch and cut algorithms to generate a solution to a MIP model.

MIP search tree 100 is comprised of nodes 102, 104, 106, and 108. Node 102 represents the root node of MIP search tree 100. Nodes 102, 104, and 108 represent MIP search tree nodes that do not reveal new integer feasible solutions. Shaded nodes 106 represent MIP search tree nodes where new integer feasible solutions are discovered during the MIP tree search.

Preferably, MIP solver 101 can perform several operations at each node within MIP search tree 100 in addition to branch and bound or branch and cut, including (i) generating cutting planes to tighten the continuous relaxation, (ii) performing node presolve to exploit logical reductions that result from previous branching decisions, but are not captured in the continuous relaxation, and (iii) node heuristics to try to generate feasible solutions from the current relaxation solution. An example of such a general MIP solver is CPLEX 9.1, distributed by ILOG, Inc. However, one of ordinary skill in the art would recognize that the described polishing algorithm could be implemented in connection with a wide variety of standard MIP solvers.

Solution pool 130 is a pool of the best distinct solutions found at that time in the MIP tree search. Polishing algorithm 140 preferably maintains a fixed-size pool of solutions. For example, polishing algorithm 140 may be programmed to maintain fifteen solutions within the solution pool, each represented in FIG. 1 as a distinct rectangle within pool 130. However, as one of ordinary skill in the art would understand, any size solution pool that is resource feasible may be used in connection with the polishing algorithm described herein.

Solutions may be entered into solution pool 130 in one of at least two ways. First, solution pool 130 contains one or more solutions found during the standard MIP tree search. Second, solution pool 130 also contains solutions generated by polishing algorithm 140. Though solution pool 130 may be only partially populated at the beginning of the MIP tree search, solution pool 130 persists for the entire search.

In a preferred embodiment, each solution within the solution pool is evaluated based upon some objective criteria. The objective criteria could be expressed as an objective expression $f(x)$, as set forth above. The evaluation yields an objective value for each solution. If a new solution is obtained either from the standard MIP tree search, or through application of polishing algorithm 140, the objective value of the new solution is compared to the objective values of the solutions already within the solution pool. If the objective value of the new solution is better than the objective value of any the solutions within solution pool 130, then the new solution is entered into the solution pool. If the objective value of the new solution is worse than the objective value of all of the solutions within the solution pool, then the new solution is not entered into solution pool 130. If the objective value of the new solution is equal to the objective value of the worst solution within solution pool 130, then the new solution may be entered in the pool 130 or discarded, depending on what is more desirable.

In another embodiment of the invention, new solutions may be entered into solution pool 130 only if the new solution is sufficiently diverse from the solutions already in the solution pool. More particularly, a new solution would only be added to the solution pool if it differed from all other solutions within the solution pool by at least k integer variables, for some chosen value k. K may be constant or vary for a given problem.

Nodes 108 and 109 represent MIP tree nodes upon which polishing algorithm 140 is performed. As described above, offspring solutions generated by the invocation of polishing algorithm 140 at node 108 or 109 may be entered into the solution pool 130.

Polishing algorithm 140 is preferably comprised of at least two general processing steps. First, polishing algorithm 140 performs a mutation process 150 on one or more solutions selected from solution pool 130. Solutions selected for mutation process 150 are referred to as seed solutions. Solutions may be selected from solution pool 130 for mutation process 150 in a number of ways. For example, one or more seed solutions may be selected randomly from solution pool 130 for mutation. Alternatively, two or more solutions may be randomly selected from solution pool 130, but only the solution with the better objective value would then be used as a seed solution for mutation process 150. Mutation process 150 may be performed a user selectable number of times prior to execution of combination process 160. Solutions generated through this mutation process may be entered into the solution pool 130 as described above.

Combination process 160 combines a plurality of parent solutions to form an offspring solution. Preferably, the selection of parent solutions to combine yields a bias towards parents with favorable objective values. However, as one of ordinary skill in the art would understand, the bias in the selection should not be too great, as such bias could compromise the diversity of the solution pool 130. Thus, in a preferred embodiment, a first parent solution is selected for combination from solution pool 130 at random. A second parent is then selected randomly from those solutions with a better objective value than the first parent. One or more additional parents may be selected from solution pool 130. As with the mutation process 150, combination process 160 may be performed a user selectable number of times, and solutions generated by the combination process may be entered into solution pool 130 as described above.

In a preferred embodiment, polishing algorithm 140 executes only one mutate/combine pass at each node of MIP search tree 100. Repeated passes of polishing algorithm 140 may be obtained by simply invoking polishing algorithm 140 at regular intervals in the MIP search tree 100 (e.g., every 100 nodes). Such a structure provides for greater flexibility. For example, by invoking the evolutionary algorithm infrequently, and thus allowing the tree search itself to perform significant work, polishing algorithm 140 can work in tight cooperation with MIP search tree 100. Alternatively, the more often polishing algorithm is invoked, the more it works in isolation from the standard MIP search. However, as one of ordinary skill in the art would understand, polishing algorithm 140 could be invoked at any or all nodes within MIP search tree 100 in accord with the present invention.

Figure 2:
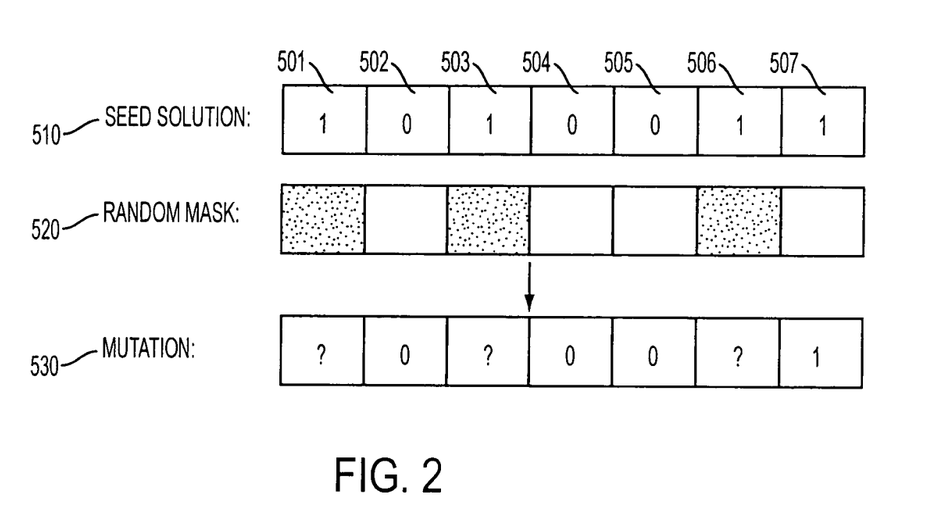
FIG. 2 shows an example of the mutation process of the present invention.

Referring now to FIG. 2, an example of mutation process 150 of the present invention is described. A mutated solution is built by first choosing a random seed solution 510 from the solution pool 130. Alternatively, seed solution 510 may be selected based on a pre-selection of two or more potential solutions, which solutions are then compared based upon their objective values.

Seed solution 510 is used to choose variables, in the original MIP model, whose values should be fixed. Specifically, a subset (represented by column labels 502, 504, 505, and 507, and which may be randomly selected) of the values of integer variables in the MIP model are fixed to the values they take in seed solution 510. Note that, in FIG. 2, the integer variables are represented by bit vectors for simplicity. However, as one of ordinary skill in the art would understand, mutation process 150 described herein is not limited to such a representation.

In the preferred embodiment, a random mask vector 520 is used to choose variables in seed solution 510 for which the values are to be fixed. In FIG. 2, the values shown in columns 502, 504, 505, and 507 of the mutation 530 are fixed, while the unfixed values (represented by question marks in columns 501, 503, and 506) form the basis for a sub-MIP. The resulting sub-MIP problem is then solved by MIP solver 101. As one of ordinary skill in the art would recognize, by integrating polishing algorithm 140 with general MIP solver 101, MIP solver 101 can be used to enforce feasibility on the resulting solution generated by mutation process 150. Any or all solutions found by the MIP solver 101 may then be considered for addition to solution pool 130.

An important consideration in mutation process 150 is the selection of the number of variables of which the values are to be fixed. If the values of too many variables are fixed, then the sub-MIP will not explore a very large space of possible alternatives. If too few are fixed, the space of possible alternatives may be too large, and the tree search may not be significantly easier than the search on the original MIP model.

Thus, in a preferred embodiment of the invention, an adaptive method for selecting the number of variables to fix is employed. In this embodiment, an initial target fixing fraction f is chosen arbitrarily (for example, 50%). The associated fixing of f of the variable values is performed, generating a sub-MIP corresponding to the unfixed fraction of the variables. Then, L nodes of the sub-MIP are explored, where L (the number of nodes to be searched) may be selected by the user based on, for example, resource constraints. If the exploration finds a solution whose objective value is worse than seed solution 510, or if no solution is found, then it is assumed that the sub-MIP is too difficult, and the target fixing fraction should be increased. If the exploration finds a solution whose objective value equals the non-fixed portion of seed solution 510 (which is by definition a feasible solution to the sub-MIP), then the MIP solver should assume that the sub-MIP is too constrained, and the target fixing fraction f should be reduced. If the exploration finds a solution whose objective value is better than the non-fixed portion of seed solution 510, the target fixing fraction is left unchanged. If the value of the fixing fraction f does not correspond to an integer number of variables, the number of variables to be fixed may be obtained by rounding up to the nearest integer, by truncating to the nearest integer, or by other methods that produce an integer number of variables to be fixed.

In another embodiment using a fixing fraction f as described above, the fixing fraction may be adjusted using slightly different methodology. If the exploration can be shown to have explored each integer feasible solution of the sub-MIP, a proven optimal sub-MIP solution will have been found, then it is assumed that the sub-MIP is too easy, and the target fixing fraction should be reduced. If the exploration cannot be shown to have explored each integer feasible solution of the sub-MIP but the exploration finds a solution whose objective value is better than the non-fixed portion of seed solution 510, the target fixing fraction is left unchanged. If the complement to the above conditions occurs (i.e. the exploration cannot be shown to have explored each integer feasible solution of the sub-MIP and the exploration finds a solution whose objective value is not better than the non-fixed portion of seed solution 510), then the fixing fraction f should be reduced. While this embodiment is not preferred, it is expected to provide many of the advantages of the preferred embodiment.

It is preferred that the value of fixing fraction f persists from one invocation of polishing algorithm 140 to the next. However, as one of ordinary skill in the art would understand, circumstances may arise such that it might be desirable to modify f at the beginning of a later invocation of polishing algorithm 140. It is preferred that after each determination as to whether to modify the value of fixing fraction f, a new random set of variable values is fixed. However, some portion, possibly a very large portion, of the variable values to be fixed may be selected in a non-random fashion.

In a preferred embodiment, a fixed number of mutation steps M are performed in each pass of polishing algorithm 140, where M is selected by the user. However, in other embodiments, M may be variable from one pass to the next. In contrast to conventional evolutionary algorithms, new solutions found during mutation process 150 are added to a solution pool 130 immediately, which solution pool persists throughout the MIP tree search. Polishing algorithm 140 therefore has no requirement of building a new generation of solutions from the previous generation of solutions. This flexibility yields a more effective procedure. Further, if the number of times that mutation process 150 is done is limited due to resource constraints, it is important to allow new, improved solutions to participate in combination and mutation as quickly as possible.

Figure 3:
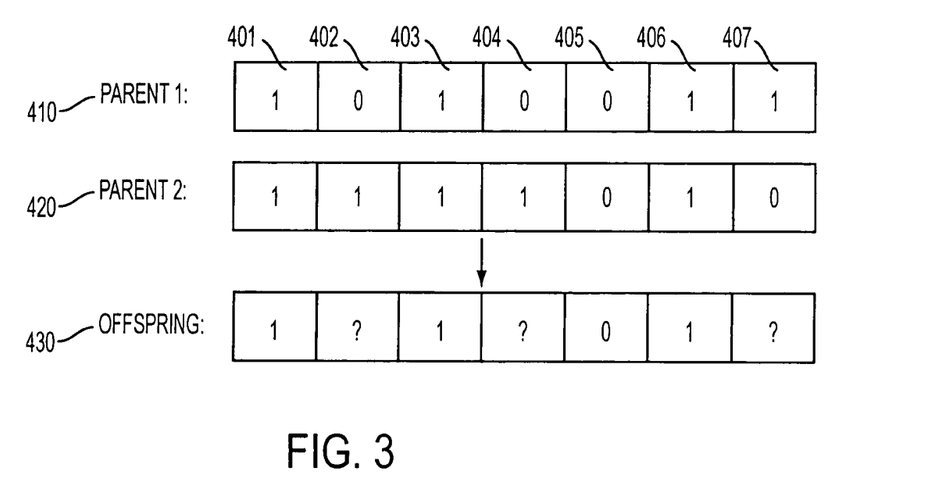
FIG. 3 shows an example of the combination process of the present invention.

Referring now to FIG. 3, an example of combination process 160 of the present invention is described. Combination process 160 selects a first parent 410 and a second parent 420 for combination. (Note that in FIG. 2, first parent 410 and second parent 420 are represented by bit vectors for simplicity. However, as one of ordinary skill in the art would understand, such a representation in not necessary in order to implement combination process 160). Moreover, more than two parents may be selected.

First parent 410 and second parent 420 may be selected in a variety of ways. For example, in one embodiment, first parent 410 and second parent 420 are selected from solution pool 130 at random. In another embodiment, solution pool 130 contains a plurality of solutions, each of which is assigned an objective value based upon a common objective criteria. First parent 410 is selected at random from solution pool 130; second parent 420 is then selected at random from those solutions within solution pool 130 with a better objective value than the objective value of first parent 410.

After first parent 410 and second parent 420 have been selected, combination process 160 uses commonality among the parent solutions to guide the search for offspring solution 430. More particularly, parent solutions 410 and 420 are combined by fixing the values of integer variables where those variables agree in value between parent solutions 410 and 420 (represented by column labels 401, 403, 405, 406) in offspring solution 430. The remaining variables in offspring solution 430 (represented by column labels 402, 404, and 407) are allowed to take any value. The problem of choosing values for the disagreeing variables is then formulated as a MIP model. Thus, completing each combination step requires solving a secondary MIP.

While the resulting secondary MIP model is typically significantly smaller than the original, this model may still be quite large and its solution may be quite resource intensive. To limit the cost, the tree search process may be truncated using an arbitrary node limit L, which may be varied in solving different MIPs or even in different iterations of solving the same MIP. The node limit is set by the user based on, for example, resource constraints. Preferably, the best solution found in L nodes is added to solution pool 130 unless the new solution already appears within solution pool 130, or unless solution pool 130 is full, and the objective value of the new solution is no better than the objective value of the worst solution in the pool 130. Where the new solution is added to a full solution pool 130, one of the other solutions in the pool 130 must be removed from the pool. In most situations, it would be desirable to remove the worst solution from the pool 130. But in some situations, a solution other than the worst may be removed. Where the objective value of the new solution is equal to the objective value of the worst solution in the pool 130, and the solution pool 130 is full, it may be desirable to replace a solution in the pool 130 with the new solution or discard the new solution.

In the preferred embodiment, a fixed number C of combination steps are performed in each pass of the polishing algorithm, where C is selected by the user. However, in other embodiments, C can be variable from one pass to the next. As described above in connection with mutation process 150, in contrast to conventional evolutionary algorithms, new solutions found during combination process 160 are added to solution pool 130 immediately, which solution pool persists throughout the MIP tree search. Polishing algorithm 140 therefore has no requirement of building a new generation of solutions from the previous generation of solutions. Pluralities of candidate solutions (e.g., parent solutions 410 and 420) from entirely different generations may be combined. As described above, this flexibility yields a more effective procedure. As also referred to above, if the number of times that combination process 160 is done is limited due to resource constraints, it is important to allow new, improved solutions to participate in combination and mutation as quickly as possible.

Also unlike conventional evolutionary algorithms, in the preferred embodiment described above polishing algorithm 140 implements mutation process 150 prior to implementing combination process 160. This allows polishing algorithm 140 to be used even if only one feasible solution is present in solution pool 130. However, in an alternative embodiment, combination process 160 can be implemented prior to mutation process 150, so long as a sufficient number of solutions exists in solution pool 130.

Figure 4:
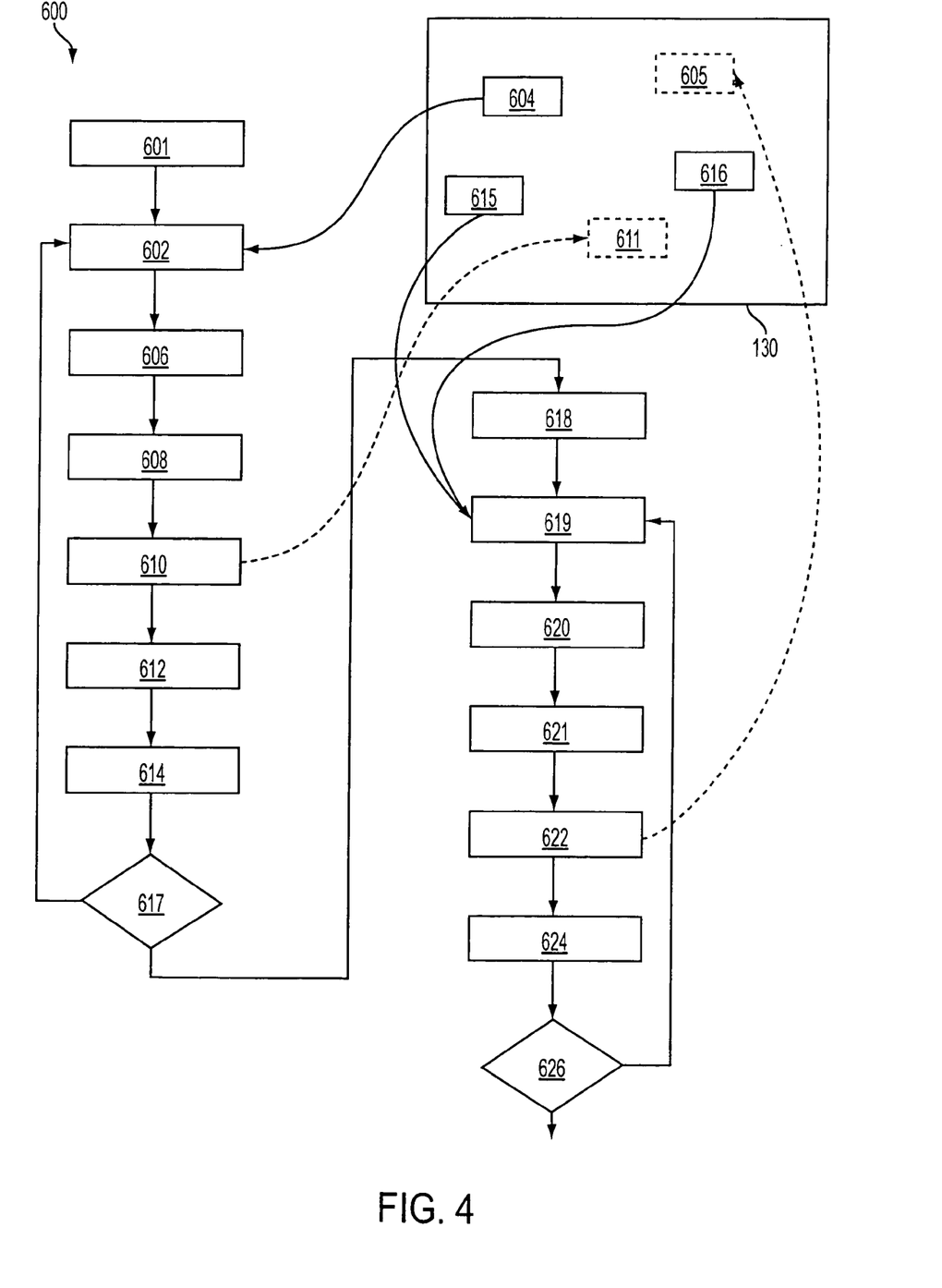
FIG. 4 shows a flow chart illustrating steps performed by the polishing algorithm of the present invention.

Referring now to FIG. 4, a flow chart 600 describing the steps performed during one iteration of polishing algorithm 140 (not shown). As described above, one of ordinary skill in the art would understand that polishing algorithm 140 may be implemented in software operating on a computer including a general purpose microprocessor.

In step 601, counter i is set to zero. In step 602, polishing algorithm 140 selects a seed solution 604 from a solution pool 130. In step 606, the program fixes a fraction f of variables in the original MIP to their values in the seed solution 604. In step 608, polishing algorithm 140 explores L nodes of the MIP search tree for the resulting sub-MIP. In step 610, polishing algorithm 140 may add the best solution found 611 to solution pool 130, based upon the objective value of the best solution found 611. In step 612, the value of f may be adjusted, based on the objective value of the best solution found. Steps 602 through 612 are repeated M times, where M is selected based on, for example, resource limitations. Thus, in step 614, counter i is incremented. In step 617, counter i is compared to M. If counter i is less than M, the flow returns to step 602. If counter i is equal to or larger than M, flow continues to step 618.

After steps 602 through 612 have been repeated M times as described above, in step 618, counter j is set to zero. In step 619, polishing algorithm 140 chooses a plurality of solutions (e.g., 615 and 616) from the solution pool 130. In step 620, polishing algorithm 140 fixes variables in the original MIP that agree between all of the plurality of solutions. In step 621, polishing algorithm 140 explores L nodes of the MIP search tree for the resulting sub-MIP problem. The value of L in step 621 may be equal to or different from the value of L in step 608. In step 622, polishing algorithm 140 may add the best solution found to the solution pool 130, based upon the objective value of the best solution found. Steps 619 through 622 are repeated C times, where the value of C is selected based on, for example, resource limitations. Thus, in step 624, counter j is incremented. In step 626, counter j is compared to C. If counter j is less than C, the flow returns to step 619. If counter j is equal to or larger than C, the flow continues.

Although described in FIG. 1 in the context of a MIP search tree, one of ordinary skill in the art would recognize that polishing algorithm 140 could easily be implemented in a manner disconnected from a general MIP tree search. In this alternative embodiment, one or more solutions from solution pool 130 are input to polishing algorithm 140, which then generates new solutions through repeated application of mutation process 150 and combination process 160, and enters the new solutions into solution pool 130 as described above.

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed is:

1. A computer comprising:
a microprocessor; and,
polishing software executing in the computer by the microprocessor to the software being enabled to:
obtain by the microprocessor, a first solution to a primary combinatorial optimization problem by determining first and second portions of the first solution;
obtain, by the microprocessor, a second solution to the primary combinatorial optimization problem by determining first and second portions of the second solution, wherein the first portion of the second solution is equal to the first portion of the first solution, and
wherein the second portion of the second solution is not equal to the second portion of the first solution;
after obtaining the first and second solutions, obtain, by the microprocessor, a third solution to the primary combinatorial optimization problem by determining first and second portions of the third solution, wherein the first portion of the third solution is determined by setting the first portion of the third solution equal to the first portions of the first and second solutions, and
wherein the second portion of the third solution is determined by solving a secondary combinatorial optimization problem, the secondary combinatorial optimization problem being formulated as a problem of which one or more solutions may be determined by applying combinatorial optimization problem solving techniques.

2. The computer of claim 1, wherein the first portion of each solution comprises a value corresponding to a variable of the primary combinatorial optimization problem.

3. The computer of claim 2, wherein the first portion of each solution further comprises a plurality of values corresponding to a plurality of variables of the primary combinatorial optimization problem.

4. The computer of claim 1, wherein the primary combinatorial optimization problem comprises a mixed integer program.

5. The computer of claim 1, wherein the second portions of the first, second, and third solutions each comprise a distinct plurality of values corresponding to a common plurality of variables of the primary combinatorial optimization problem.

6. The computer of claim 5, wherein a value of the plurality of values of the second portion of the third solution is equal to a value of the plurality of values of the second portion of either the first or second solution.

7. A method executed on a computer comprising:
obtaining, by the microprocessor of the computer, a first solution to a primary mixed integer program by determining first and second portions of the first solution;
obtaining, by the microprocessor of the computer, a second solution to the primary mixed integer program by determining first and second portions of the second solution, wherein the first portion of the second solution is equal to the first portion of the first solution, and wherein the second portion of the second solution is not equal to the second portion of the first solution;
after obtaining the first and second solutions, obtaining, by the microprocessor of the computer, a third solution to the primary mixed integer program by determining first and second portions of the third solution, wherein the first portion of the third solution is determined by setting the first portion of the third solution equal to the first portions of the first and second solutions, and wherein the second portion of the third solution is determined by solving a secondary mixed integer program,
the secondary mixed integer program being formulated as a problem of which one or more solutions may be determined by applying mixed integer program solving techniques.

8. The method of claim 7, wherein the first portion of each solution comprises a value corresponding to a variable of the primary mixed integer program.

9. The method of claim 8, wherein the first portion of each solution further comprises a plurality of values corresponding to a plurality of variables of the primary mixed integer program.

10. The method of claim 7, wherein the primary mixed integer program comprises a mixed integer linear program.

11. The method of claim 7, wherein the second portions of the first, second, and third solutions each comprise a distinct plurality of values corresponding to a common plurality of variables of the primary mixed integer program.

12. The method of claim 11, wherein a value of the plurality of values of the second portion of the third solution is equal to a value of the plurality of values of the second portion of either the first or second solution.

13. A non-transitory computer readable storage medium comprising a storage device storing a software arrangement operable on a microprocessor, the software arrangement comprising at least one computer program which, when executed by the microprocessor, causes the microprocessor to carry out a method comprising
selecting, by the microprocessor, a first solution to a primary combinatorial optimization problem from a pool of one or more solutions to the problem, each solution of the pool comprising a plurality of values corresponding to a plurality of variables of the combinatorial optimization problem; and
attempting, by the microprocessor, to obtain a second solution to the primary combinatorial optimization problem by configuring the processor to fix each value of a random first portion of one or more variables of the primary combinatorial optimization problem equal to each value of the same portion of one or more variables of the first solution, and
attempt to determine values of a remaining second portion of the remaining variables of the primary combinatorial optimization problem by solving a secondary combinatorial optimization problem, the secondary combinatorial optimization problem being formulated as a problem of which one or more solutions may be determined by applying combinatorial optimization problem solving techniques;
wherein, the number of variables in the first portion of the primary combinatorial optimization problem is determined through use of a fixing fraction.

14. The computer readable medium of claim 13, wherein each solution in the pool has an objective value.

15. The computer readable medium of claim 13, wherein each solution in the pool is an integer feasible solution.

16. The computer readable medium of claim 13, wherein the random first portion comprises one value corresponding to one variable of the primary combinatorial optimization problem.

17. The computer readable medium of claim 16, wherein the random first portion further comprises a plurality of values corresponding to a plurality of variables of the primary combinatorial optimization problem.

18. The computer readable medium of claim 13, wherein the primary combinatorial optimization problem comprises a mixed integer program.

19. The computer readable medium of claim 13, wherein the remaining second portion of the second solution comprises a plurality of values corresponding to a plurality of variables of the primary combinatorial optimization problem.

20. The computer readable medium of claim 13, wherein the software arrangement further causes the processor to:
adjust the value of the fixing fraction based on a comparison of an objective value of the second solution to an objective value of the first solution.

21. The computer readable medium of claim 20, wherein, the value of the fixing fraction is increased if the objective value of the second solution is worse than the objective value of the first solution.

22. The computer readable medium of claim 20, wherein, the value of the fixing fraction is decreased if the objective value of the second solution is equal to the objective value of the first solution.

23. The computer readable medium of claim 20, wherein, the value of the fixing fraction is not changed if the objective value of the second solution is better than the objective value of the first solution.

24. The computer readable medium of claim 20, wherein, the value of the fixing fraction is decreased if each integer feasible solution of the secondary combinatorial optimization problem is found.

25. The computer readable medium of claim 20, wherein, the value of the fixing fraction is increased if at least one integer feasible solution of the secondary combinatorial optimization problem is not found and the objective value of the second solution is not better than the objective value of the first solution.

26. The computer readable medium of claim 13, wherein the software arrangement further causes the processor to:
increase the value of the fixing fraction if a second solution is not found.

27. A method executed on a computer by a microprocessor, the method comprising:
selecting a first solution, by the microprocessor of the computer, to a primary combinatorial optimization problem from a pool of one or more solutions to the problem, each solution of the pool comprising a plurality of values corresponding to a plurality of variables of the combinatorial optimization problem; and
attempting, by the microprocessor of the computer, to obtain a second solution to the primary combinatorial optimization problem by fixing each value of a random first portion of one or more variables of the primary combinatorial optimization problem equal to each value of the same portion of one or more variables of the first solution, and
attempting, by the microprocessor of the computer, to determine values of a remaining second portion of the remaining variables of the primary combinatorial optimization problem by solving a secondary combinatorial optimization problem, the secondary combinatorial optimization problem being formulated as a problem of which one or more solutions may be determined by applying combinatorial optimization problem solving techniques;
wherein, the number of variables in the first portion of the primary combinatorial optimization problem is determined through use of a fixing fraction.

28. The method of claim 27, wherein each solution in the pool has an objective value.

29. The method of claim 27, wherein each solution in the pool is an integer feasible solution.

30. The method of claim 27, wherein the random first portion comprises one value corresponding one variable of the primary combinatorial optimization problem.

31. The method of claim 30, wherein the random first portion further comprises a plurality of values corresponding to a plurality of variables of the primary combinatorial optimization problem.

32. The method of claim 27, wherein the primary combinatorial optimization problem comprises a mixed integer program.

33. The method of claim 27, wherein the remaining second portion of the second solution comprises a plurality of values corresponding to a plurality of variables of the primary combinatorial optimization problem.

34. The method of claim 27, further comprising:
comparing, by the microprocessor of the computer, an objective value of the second solution to an objective value of the first solution; and
adjusting, by the microprocessor of the computer, the value of the fixing fraction based on result of the comparison.

35. The method of claim 34, wherein, the value of the fixing fraction is increased if the objective value of the second solution is worse than the objective value of the first solution.

36. The method of claim 34, wherein, the value of the fixing fraction is decreased if the objective value of the second solution is equal to the objective value of the first solution.

37. The method of claim 34, wherein, the value of the fixing fraction is not changed if the objective value of the second solution is better than the objective value of the first solution.

38. The method of claim 34, wherein, the value of the fixing fraction is decreased if each integer feasible solution of the secondary combinatorial optimization problem is found.

39. The method of claim 34, wherein, the value of the fixing fraction is increased if at least one integer feasible solution of the secondary combinatorial optimization problem is not found and the objective value of the second solution is not better than the objective value of the first solution.

40. The method of claim 27, further comprising, increasing the value of the fixing fraction if a second solution is not found.

* * * * *